US008327356B2

(12) United States Patent
Seguin et al.

(10) Patent No.: US 8,327,356 B2
(45) Date of Patent: Dec. 4, 2012

(54) METHOD AND SYSTEM FOR SUPPORTING WAKE-ON-LAN IN A VIRTUALIZED ENVIRONMENT

(75) Inventors: Jean-Marc L. Seguin, Stittsville (CA); Colin Patrick Jack, Carleton Place (CA)

(73) Assignee: Embotics Corporation, Ottawa (CA)

( * ) Notice: Subject to any disclaimer, the term of this patent is extended or adjusted under 35 U.S.C. 154(b) by 820 days.

(21) Appl. No.: 12/407,719

(22) Filed: Mar. 19, 2009

(65) Prior Publication Data

US 2009/0241113 A1 Sep. 24, 2009

Related U.S. Application Data

(60) Provisional application No. 61/038,317, filed on Mar. 20, 2008.

(51) Int. Cl.
*G06F 9/455* (2006.01)
*G06F 15/177* (2006.01)
*G06F 1/00* (2006.01)

(52) U.S. Cl. ............................. 718/1; 709/222; 713/310
(58) Field of Classification Search ........................ 718/1
See application file for complete search history.

(56) References Cited

U.S. PATENT DOCUMENTS

| 2005/0154928 A1* | 7/2005 | Larson et al. ................. 713/300 |
| 2005/0160162 A1* | 7/2005 | Cromer et al. ................ 709/223 |
| 2008/0229091 A1* | 9/2008 | Abu-Akel ......................... 713/2 |
| 2009/0133040 A1* | 5/2009 | Stevens, IV ................... 719/315 |

OTHER PUBLICATIONS

White Paper: Wake on LAN Technology, Liberman Software Corporation, Jun. 1, 2006.
Basic System Administration, ESX Server 3.5, Virtual Center 2.5, published by VMware, Inc., 2006.
Wake-on-LAN, article published in Wikipedia encyclopedia, Mar. 18, 2008.

* cited by examiner

*Primary Examiner* — Meng An
*Assistant Examiner* — Blake Kumabe
(74) *Attorney, Agent, or Firm* — IP-MEX Inc.; Victoria Donnelly

(57) ABSTRACT

A method and system for supporting Wake-on-LAN technology in a virtualized environment is described. An improved virtual switch comprises a listener, which receives a power-on message on behalf of virtual machines, extracts addresses of the virtual machines to be powered on, which are embedded in the power-on message, compares the extracted addresses with addresses of the virtual machines stored in a database, and selectively powers on those virtual machines for which the extracted and stored addresses match.

22 Claims, 10 Drawing Sheets

METHOD AND SYSTEM FOR SUPPORTING WAKE-ON-LAN IN A VIRTUALIZED ENVIRONMENT

RELATED APPLICATIONS

The present patent application claims priority from the U.S. provisional application Ser. No. 61/038,317 to Jean-Marc SEGUIN et al. entitled "Method And System For supporting Wake-On-LAN in a Virtualized Environment" filed on Mar. 20, 2008, which is incorporated herein by reference.

FIELD OF INVENTION

The invention relates to virtual machines (VMs) and computer systems using VMs, in particular, to a method and system for supporting Wake-on-LAN (WOL) in a virtualized environment.

BACKGROUND OF INVENTION

Virtualization of computing systems has become quite prevalent in recent times. It refers to a new layer that abstracts computer hardware from operating system (OS), and associated applications that run on it. Virtualization technique allows the computer hardware to support concurrent running of more than one operating system and applications associated with the operating systems held in containers called virtual machines, controlled and scheduled by a virtual machine monitor (VMM). This has offered a way for computer operators to consolidate, optimize and increase efficiencies of computing platforms while simplifying application deployment. To improve energy efficiency, virtual machines that are not currently operational are often powered off. Virtualization in general and powering off inactive VMs to save energy are in line with a green computing initiative that is becoming increasingly popular in various information technology domains. Such powered off virtual machines may need to be powered on upon a command from the system administrator for performing system maintenance. Using existing WOL technology to selectively power on computer systems is known. Providing WOL support in a virtualized environment, however, has its own challenges that will be described next. Before discussing WOL for virtualized environments a short introduction to the existing WOL technology is provided.

Wake-on-LAN technology is used by system administrators for doing maintenance on computer systems that are sleeping. Wake-on-LAN technology has been known since 1997, see, for example, "Wake-on-LAN" article from Wikipedia encyclopedia published on-line at http://en.wikipedia.org/wiki/Wake_on_lan, last modified Mar. 12, 2008, and White paper "White on LAN Technology" by Lieberman Software Corporation on published on-line on Jun. 1, 2006 at URL: http://www.liebsoft.com/whitepapers/pdf_files/Wake_On_LAN.pdf.

Many users turn off their computer systems (both desktop and server) at night to save energy. System administrators, however, need to do work at night, while users are away from their computer systems. Using the WOL technology, system administrators can wake up (power on) any number of sleeping (powered off) computer systems in minutes without making a physical visit to these computer systems. In this way they can make changes to multiple computers without impeding productivity of users who are not using their computers at that time.

Please note that although a computer system to be powered on is shutdown it has power to its network interface card (NIC) and some other parts of the computer system. Powering on the computer system in a Local Area Network (LAN) remotely, typically follows the following steps.

1. The NIC listens for a specific packet, called "Magic Packet" which is a broadcast frame represented in hexadecimal: FF FF FF FF FF FF followed by sixteen repetitions of a Media Access Control (MAC) address of the computer to be powered on. The Magic Packet is broadcast on a broadcast address for a particular subnet of LAN, or an entire LAN, in which case a special hardware and/or software/network configuration may be required.

2. The NIC receives this Magic Packet, checks it for correct information, and then turns on the main power of the computer system if the Magic Packet is valid and the MAC address of the NIC matches with the MAC address in the Magic Packet.

FIG. 1 shows a block diagram 10, which illustrates the operation of the existing WOL technology. In FIG. 1 an Administrative System 12 is connected by a LAN 14 that includes a network switch 16 and computer systems 18, 20 and 22. Each computer system is running in V-Aux and is connected to a network switch 16 through a NIC. NICA 7, NICB 8 and NICC 9 respectively connect computer systems 18, 20 and 22 with the network switch 16. Each NIC has a MAC address abbreviated as MAC ADDR in FIG. 1. V-Aux refers to auxiliary power being sent to the NIC to keep it in a state in which it can receive the Magic Packet while rest of the computer is running on minimal power. First, the Magic Packet is broadcast from the Administrative System 12 on a LAN 14 (or a subnet of the LAN 14), the step of broadcasting being schematically shown as step ① in FIG. 1. The network switch 16 broadcasts the Magic Packet to all ports of computer systems connected to the LAN 14 (step ②). If a NIC on reserve power receives the Magic Packet containing its MAC address, it powers on the computer system (step ③). In this example, one or more of computer systems 18, 20, or 22 shown in FIG. 1 can be powered on in this way.

As discussed earlier, virtualization technology allows more than one VM comprising a Guest OS and applications to share a single computer system. Each virtual machine is provided with simulated computer hardware such that the Guest OS and application can run in isolation without making any modifications to them. Please note that VMs run on top of a virtualization platform which includes a hypervisor.

With all the advantages that have been offered by virtualization, it does not support the existing WOL technology as there is no NIC on reserve power for each VM listening for the Magic Packet.

Thus, there is an existing need in the industry for an improved and effective method for supporting Wake-on-LAN in a virtualized environment.

SUMMARY OF THE INVENTION

Therefore there is an object of the present invention to provide an improved method and system for supporting Wake-On-LAN in a virtualized environment.

According to one aspect of the invention, there is provided a method for supporting Wake-on-LAN (WOL) for selectively powering on virtual machines in a computer in a local area network (LAN), the method comprising: (a1) assigning respective unique addresses to the virtual machines; (b1) connecting the virtual machines to the LAN through a virtual switch including a Listener for selecting one or more virtual machines to be powered on; (c1) by the Listener, receiving a power-on message including unique addresses of said one or more virtual machines; (d1) by the Listener, decoding the power-on message to extract the unique addresses received in the step (c1); (e1) by the Listener, comparing extracted unique addresses extracted in the step (d1) with assigned unique addresses assigned in the step (a1); and (f1) powering on those virtual machines, whose assigned unique addresses match with the extracted unique addresses. The method further comprises a step of storing the assigned unique addresses in a database, the step being performed after the step (a1). The step (e1) comprises: (a3) sending a query including the extracted unique addresses to the database; and (b3) receiving a response including the assigned unique addresses stored in the databases that matched the extracted unique addresses. The step (f1) further comprises: (a4) selecting a power-on command depending on a virtualization platform on which a virtual machine is running; and (b4) sending the power-on command selected in the step (a4) to the virtual machine. The step of storing the assigned unique addresses further comprises: (a5) receiving a command for registering a virtual machine for enabling the Wake-on LAN on the virtual machine, the command including the assigned unique address of the virtual machine; and (b5) recording the assigned unique address of the virtual machine in the database. The method further comprises a step of disabling the Wake-on LAN on selected virtual machines in response to an un-registering command. The step of disabling the Wake-on LAN on selected virtual machines comprises: (a7) receiving the un-registering command for the virtual machine, the un-registering command including the assigned unique address of the virtual machine; and (b7) removing the assigned unique address of the virtual machine from the database. The assigned unique address is a Media Access Control (MAC) address of the virtual machine. The method further comprises a step of running the virtual machines and the Listener on a hypervisor.

According to one of the embodiments of the invention, the method further comprises: (a19) by the Listener, receiving a power-off message including unique addresses of virtual machines to be powered off; (b19) by the Listener, decoding the power-off message to extract the unique addresses received in step (a19); (c19) by the Listener, comparing the extracted unique addresses with the assigned unique addresses; and (d19) powering off the virtual machines, the assigned addresses of which match the extracted unique addresses; the steps (a19)-(d19) being performed after the step (f1).

The Listener (c10) comprises a message checker receiving a message through the virtual switch (b10), the message comprising unique addresses of one or more virtual machines and a message type including one of power-on and power-off and based on the message type, powering on or powering off those virtual machines, whose assigned unique addresses stored in the database (c10) match with the unique addresses in the message. The virtual switch (b10) comprises: a first virtual switch (a21), connecting a subset of virtual machines to the LAN and providing support for the Wake-on LAN; and a second virtual switch (b21) free of connection to the LAN, connecting remaining virtual machines with the subset of virtual machines connected to the LAN through the first virtual switch for providing inter-communication among the virtual machines; and wherein the Listener receives the power-on message through the first virtual switch (a21), the message including unique addresses of one or more virtual machines.

According to another aspect of the invention, there is provided a system for supporting Wake-on-LAN (WOL) for selectively powering on virtual machines in a computer in a local area network (LAN), the system comprising: a processor; a computer readable medium comprising computer readable instructions stored thereon for execution by the processor, forming the following: (a10) a database storing a unique address assigned to each virtual machine; (b10) a virtual switch, connecting the virtual machines to the LAN and providing support for the Wake-on LAN; and (c10) a Listener receiving a power-on message through the virtual switch, the message including unique addresses of one or more virtual machines to be powered on, and powering on those virtual machines, whose assigned unique addresses stored in the database match with the unique addresses in the message. In the system the Listener comprises the database and the virtual switch comprises the Listener. The Listener further comprises: a Rules Engine (a13) processing the power-on message for selectively powering on the virtual machines; a Web Services Interface (b13) managing and configuring the Listener including registering and un-registering of the virtual machines; and a Configuration Block (c13) providing administrative access for enabling or disabling of the Wake-on LAN on the virtual machines. The Rules Engine (a13) comprises: a Receiver (a14), receiving the power-on message including unique addresses of one or more virtual machines to be powered on; and a Decoder (b14), decoding the power-on message for extracting the unique addresses from the power-on message received by the Receiver, comparing the extracted unique addresses with the assigned unique addresses, and sending a power-on command to the virtual machines, the assigned addresses of which match the extracted unique addresses. The system further comprises a Registration Handler, processing commands for enabling or disabling the Wake-on LAN on the virtual machines. In the system described above, the computer includes a hypervisor for running the virtual machines and the Listener. The system may include another computer connected to the LAN for running the Listener.

A computer readable storage medium, having a computer readable program code instructions stored thereon, when executed by a computer, to perform the steps of the method as described in the application, is also provided.

According to yet another embodiment of the invention there is provided a method for supporting Wake-on-LAN (WOL) for selectively powering on a set of virtual machines in a computer in a local area network (LAN), the method comprising: (a22) assigning respective unique addresses to the virtual machines; (b22) connecting a subset of the virtual machines to the LAN through a first virtual switch, including a Listener for selecting one or more virtual machines in the set to be powered on; (c22) connecting remaining virtual machines with the subset of virtual machines connected to the LAN through the first virtual switch by a second virtual switch that is free from communication with the LAN, for providing inter-communication among the virtual machines; (d22) by the Listener, receiving a power-on message including unique addresses of said one or more virtual machines in the set of virtual machines; (e22) by the Listener, decoding the power-on message to extract the unique addresses received in the step (d22); (f22) by the Listener, comparing extracted unique addresses extracted in the step (e22) with assigned unique addresses assigned in the step (a22); and (g22) powering on those virtual machines in the set of virtual machines, whose assigned unique addresses match with the extracted unique addresses.

BRIEF DESCRIPTION OF THE DRAWINGS

Further features and advantages of the invention will be apparent from the following description of the embodiments of the present invention, which are described by way of example only and with reference to the accompanying drawings in which.

DETAILED DESCRIPTION OF THE EMBODIMENTS OF THE INVENTION

Figure 2:
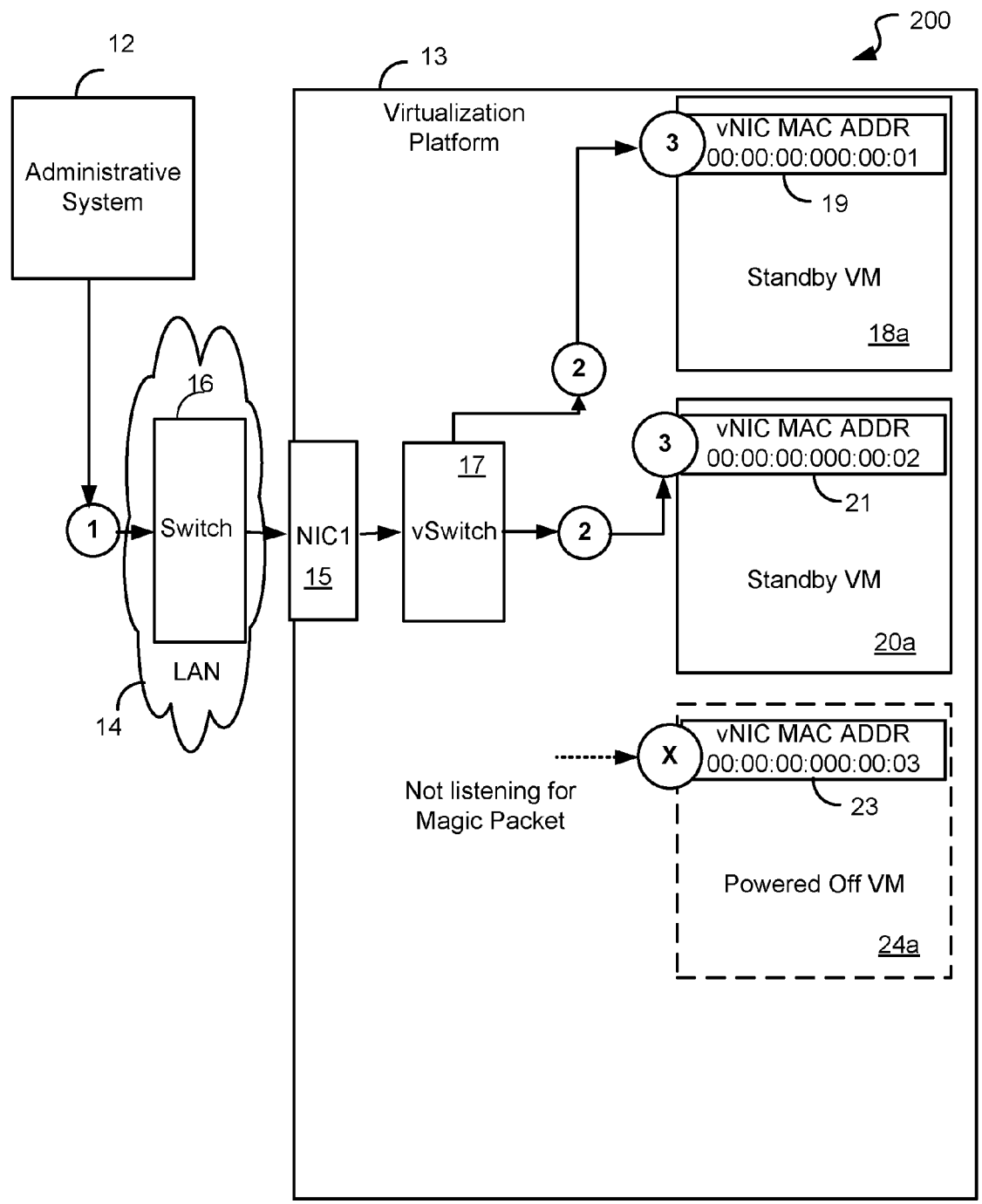
FIG. 2 illustrates limitations of the prior art WOL technology in a virtualized environment.

FIG. 2 shows a block diagram 200 illustrating limitations of the existing WOL technology in a virtualized environment as recognized by inventors of the present application. The Administrative System 12 is connected to the LAN 14 through the network switch 16 that in turn is connected to a network interface card1 (NIC1) 15. NIC1 15 connects the LAN 14 to a virtualization platform 13 of the computer system, hosting three virtual machines: a Standby VM 18a, a Standby VM 20a and a powered off VM 24a. Power has been switched off for the powered off VM 24a. Each VM is has its respective NIC. NIC1 15 is connected to virtual switch (vSwitch) 17 that is an Ethernet switch with layer 2 forwarding engine. When a VM is powered on, a virtual network interface card (vNIC), e.g., vNIC 19, 21, or 23 of respective VMs 18a, 20a and 24a, are connected to the vSwitch 17 and then presented to the VM. Each vNIC 19, 21, 23 is characterized by its own MAC address. For the sake of simplicity, in the embodiments of the invention, we will reference VMware Virtual Infrastructure 3 (ESX 3) as a virtualization platform 13 for a computer system, but it is understood that other virtualization solutions may also be applicable within the scope of the present invention. A guide for ESX 3 (Vi3 administration guide) has been submitted in the Information Disclosure Statement (IDS), it can be also found at Vmare website at the following link: http://www.vmware.com/pdf/vi3_35/esx_3/r35/vi3_35_25_admin_guide.pdf.

VMware ESX 3 virtualizes processors, memory, and disks in a computer system as well as a LAN connecting multiple computer systems. One or more VMs comprising its Guest operating system and applications can execute on this virtualization platform. The LAN is also virtualized, and each VM is connected to a specific LAN, for example, through a virtual network interface card (vNIC) connected to a virtual switch.

Figure 1:
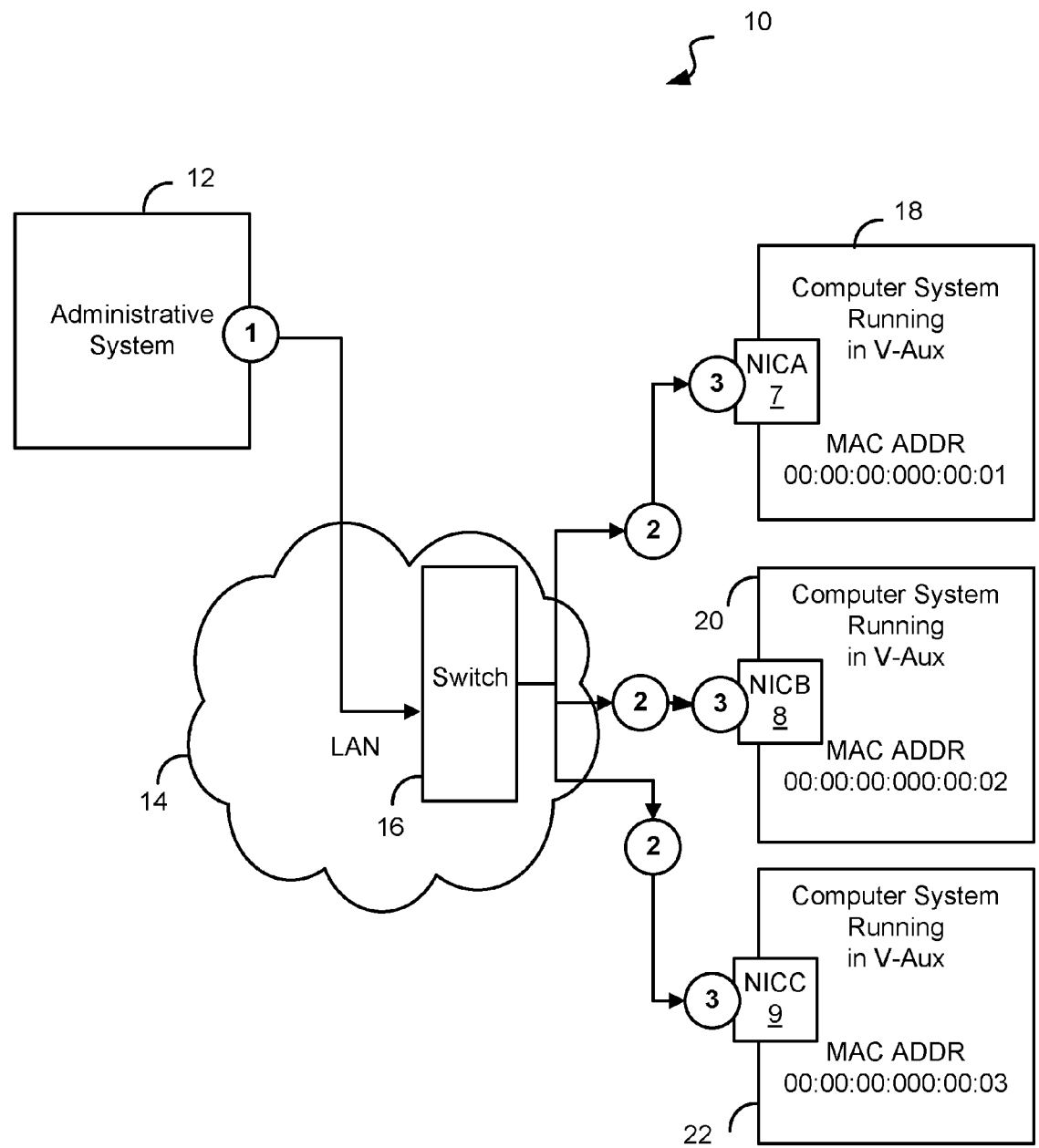
FIG. 1 schematically illustrates the operation of the prior art WOL technology.

A virtual switch such as the vSwitch 17 maintains a MAC port forwarding table and can be managed remotely by an administrator. There can be up to 4 vNICs in a VM supported by ESX 3, each of which can be connected to a different vSwitch, which in turn, is connected to a different LAN. Only one such vSwitch (vSwitch 17) is shown in FIG. 2 for clarity. The vNIC 19, 21 and 23 are designed to simulate a common commercial network interface card, such as the NICA 7, NICB, 8 and NICC 9 of FIG. 1.

The vSwitch 17 can handle various types of traffic that includes: vNIC to LAN traffic, LAN to vNIC traffic, and vNIC to vNIC traffic. Every frame/packet for each of these traffic types goes through four basic modules. There is a pre-processing module, which assists in filtering out unwanted traffic; a forwarding engine; a teaming engine; and a post-processing engine, which sends packets out through a destination port.

In FIG. 2, a power-on message in the form of a Magic Packet is broadcast from the Administrative System 12 (step ①). The vSwitch 17 maintains a MAC port forwarding table that is used to forward packets to VMs that are identified in the Magic Packet. When a VM is powered off, the vSwitch 17 does not forward packets to the MAC address for the VM as it is no longer exposed. This means that the powered off VM 24a of FIG. 2 is not listening for the Magic Packet. As a result, it is not possible for it to receive the power-on message initiated by the Administrative System 12 on its own.

Thus, to present a network interface card on behalf of a VM that is powered off, it is necessary for the virtualization platform 13 to present to the LAN 14 a network interface card in listening mode awaiting the Magic Packet.

Figure 3:
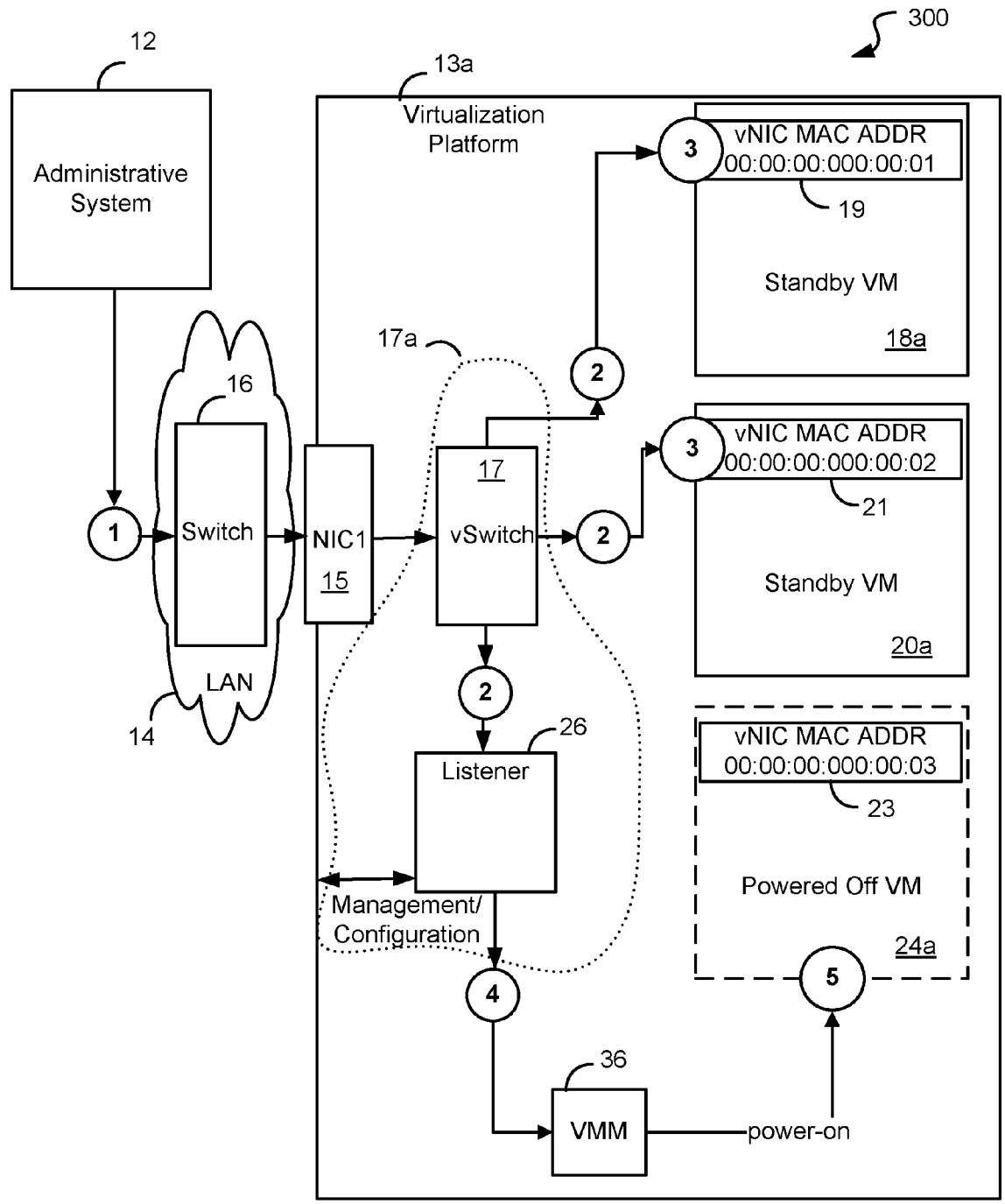
FIG. 3 illustrates an improved WOL technology of the embodiment of the present invention, which is suitable for a virtualized environment.

FIG. 3 shows a system 300 for supporting WOL for selectively powering on virtual machines in a computer in a local area network according to the embodiment of the present invention. Similar elements on FIGS. 2 and 3 are labeled with same reference numerals. The system comprises a computer having a processor (not shown), and a computer readable storage medium, e.g., memory, DVD, CD-ROM, having computer readable instructions stored thereon, which, when executed by the processor, form a virtualization platform 13a of the embodiment of the invention, including an improved virtual switch vSwitch 17a having unique functional components as will be described in detail below.

Virtualization platform 13a of the embodiment of the invention comprises an improved vSwitch 17a, including a WOL Listener, or Listener 26, which allows the vSwitch 17a to become a proxy for each VM with vNIC 19, 21, 23 connected to it, which is configured for WOL. Each VM is assigned a unique address. In the preferred embodiment the assigned unique address of the VM is its respective vNIC MAC address as shown in FIG. 3. The vNIC MAC address for vNIC 19, 21 and 23 are 00:00:00:000:00:01, 00:00:00:000:00:02 and 00:00:00:000:00:03 respectively. Each VM is also associated with a unique identification number (ID). These assigned unique addresses of VMs are stored in a database that is used in selectively powering on the VMs.

The improved WOL technology of the embodiment of the invention operates as follows.

1. A power-on message for powering on VMs containing the Magic Packet is broadcast from the Administrative System 12 (step ① in FIG. 3).
2. vSwitch 17a broadcasts the power-on message containing the Magic Packet to the vNICs 19, 21 and 23 and to the Listener 26 (step ② in FIG. 3). The power-on message includes assigned unique addresses of the VMs (MAC addresses) to be powered on.

3. Request is ignored by vNICs whose assigned unique addresses do not match the assigned unique addresses included in the power-on message (step ③).
4. The Listener 26 uses the database and compares the MAC addresses to the assigned unique addresses of VMs (step ④). In FIG. 3, the Listener 26 extracts the unique address embedded in the power-on message and finds a match with the assigned unique address of VM 24a (with vNIC 23) for which it is proxying. Please note that in the system shown in FIG. 3, VM24a which was powered off initially needed to be powered on. In general, multiple VMs can be powered on through one power-on message. VMs to be powered on as identified during address matching are required to be specified for power-on command for the virtualization platform 13a. The vSwitch 17a sends a power-on command which is platform dependent to a Virtual Machine Manager (VMM) 36 of the virtualization platform 13a (through its own Software Development Kit) specifying the VM to power on. The Listener 26 within the vSwitch 17a performs this operation. For the system shown in FIG. 3, it will send the power-on command specifying the powered off VM 24a that is to be powered on.
5. Thus, the VM, for example VM 24a, is powered on (step ⑤ in FIG. 3).

As part of a configuration step, the vSwitch 17a can be set up to listen for a particular Magic Packet or a list of specific Magic Packets, which is performed at a Configuration Block within the vSWitch 17a that is described next. Normally, the vSwitch 17a related to the VMs, for example VM 18a, 20a, or 24a, would be the proxy for those VMs.

Figure 4A:
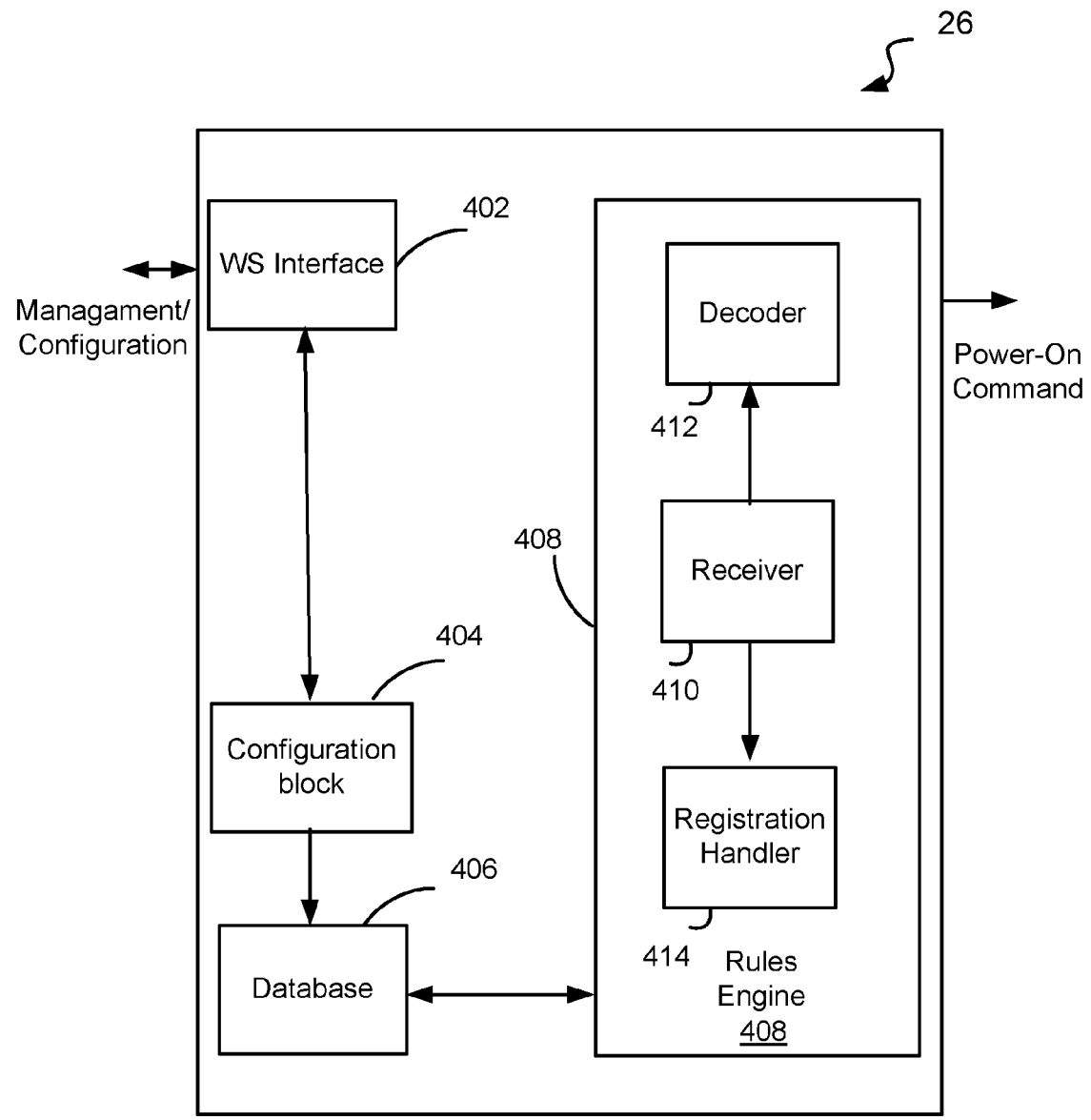
FIG. 4(a) displays functional components of Listener 26 of FIG. 3.

FIG. 4(a) illustrates functional components of the Listener 26 including: a Web Services Interface 402, a Database 406, the Configuration Block 404 and a Rules Engine 408. These functional components comprise a firmware, or alternatively, computer readable instructions stored in a computer readable storage medium, which, when executed by a processor, form the functional components 402, 404, 406 and 408 of the Listener 26. The computer readable storage medium may comprise computer memory, DVD, CD-ROM, floppy or another computer readable storage medium.

Each of the functional components of the Listener 26 is described below.

Web Service (WS) Interface 402 is an interface through which the system administrator performs configuration and management of the Listener 26. Commands registering/un-registering a VM for WOL support are received through this interface.

Database 406 includes a list of assigned unique addresses (MAC addresses) and IDs for all the VMs on which WOL is enabled. The MAC address corresponds to the vNIC that connects the VM to the vSwitch 17a. Each ID in turn corresponds to a specific VM. These addresses and IDs are stored in a computer storage medium.

Configuration Block (404) performs access control for reading or writing of the Database 406. It enables only authorized users to insert, delete or change the assigned unique addresses of VMs.

Rules Engine 408 is a component, which, upon receiving the power-on message containing the Magic Packet, extracts the unique addresses of VMs in the power-on message, and determines if there is a match in the Database 406 (i.e. whether it needs to proxy WOL for that MAC address). Then it powers on the VMs, the assigned unique addresses of which match with extracted unique addresses extracted from the power-on message. Please note that the assigned unique addresses of VMs are stored in the Database 406. The Rules Engine 408 in turn includes a Decoder 412, a Receiver 410 and a Registration Handler 414. Each of these is briefly described.

Receiver 410 listens for messages used for powering on virtual machines. As soon as a power-on message containing the Magic Packet is received the Receiver 410 passes on the power-on message to the Decoder 412.

Decoder 412 decodes the power-on message received by the Receiver 410 for extracting the unique addresses from the power-on message, compares the extracted unique addresses with the assigned unique addresses stored in the Database 406. Then it sends the power-on command to the VMM 36 for powering on virtual machines, the assigned unique addresses of which match the extracted unique addresses.

Registration Handler 414 processes commands for enabling/disabling the Wake-on-LAN on the virtual machines. A command for registering a VM, records the assigned unique address of the virtual machine and its ID in the Database 406, enabling WOL on the VM. A command for un-registering a VM, removes the assigned unique address and the ID of the virtual machine from the Database 406, thus disabling WOL on the VM.

Figure 4B:
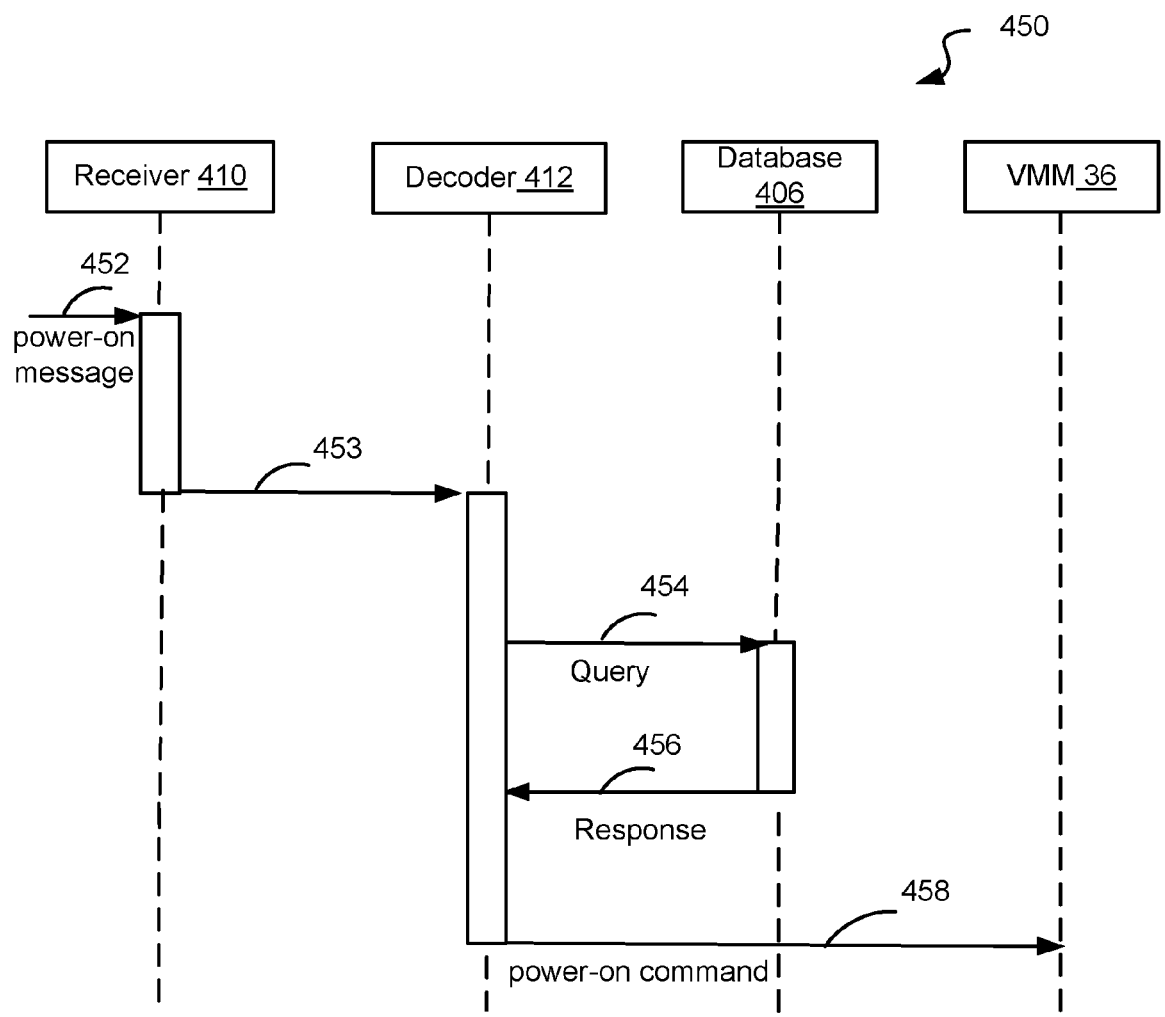
FIG. 4(b) illustrates a sequence of operations and messages for the Listener 26 after reception of a power-on message.

The operation of the Rules Engine 408 is explained further with a sequence diagram 450 presented in FIG. 4(b) that captures a sequence of operations performed when a power-on message 452 arrives at the Listener 26. Flow of messages and control are shown with the help of arrows. The power-on message 452 for powering on a powered off virtual machine such as 24a, is sent by a system administrator through the LAN 14 and is received by the Receiver 410. The Receiver 410 invokes (arrow 453) the Decoder 412 that decodes the power-on message 452 for extracting the unique addresses of VMs in the power-on message 452 received by the Receiver 410 and compares these extracted unique addresses with the assigned unique addresses stored in the Database 406. This is achieved by sending a Query 454 to the Database 406. Upon receiving the Query 454, the extracted unique addresses are matched with the assigned unique addresses of VMs stored in the Database 406 that sends back a Response 456 identifying VMs the assigned unique addresses of which matched the extracted unique addresses. Upon a successful match, the Decoder 412 determines the power-on command for the virtualization platform 13a for the VM to be powered on and sends the power-on command 458 to the VMM 36 through its own Software Development Kit, specifying the VM to be powered on. Power-on messages are not sent if the Response 456 indicates no address match in the Database 406.

Figure 5A:
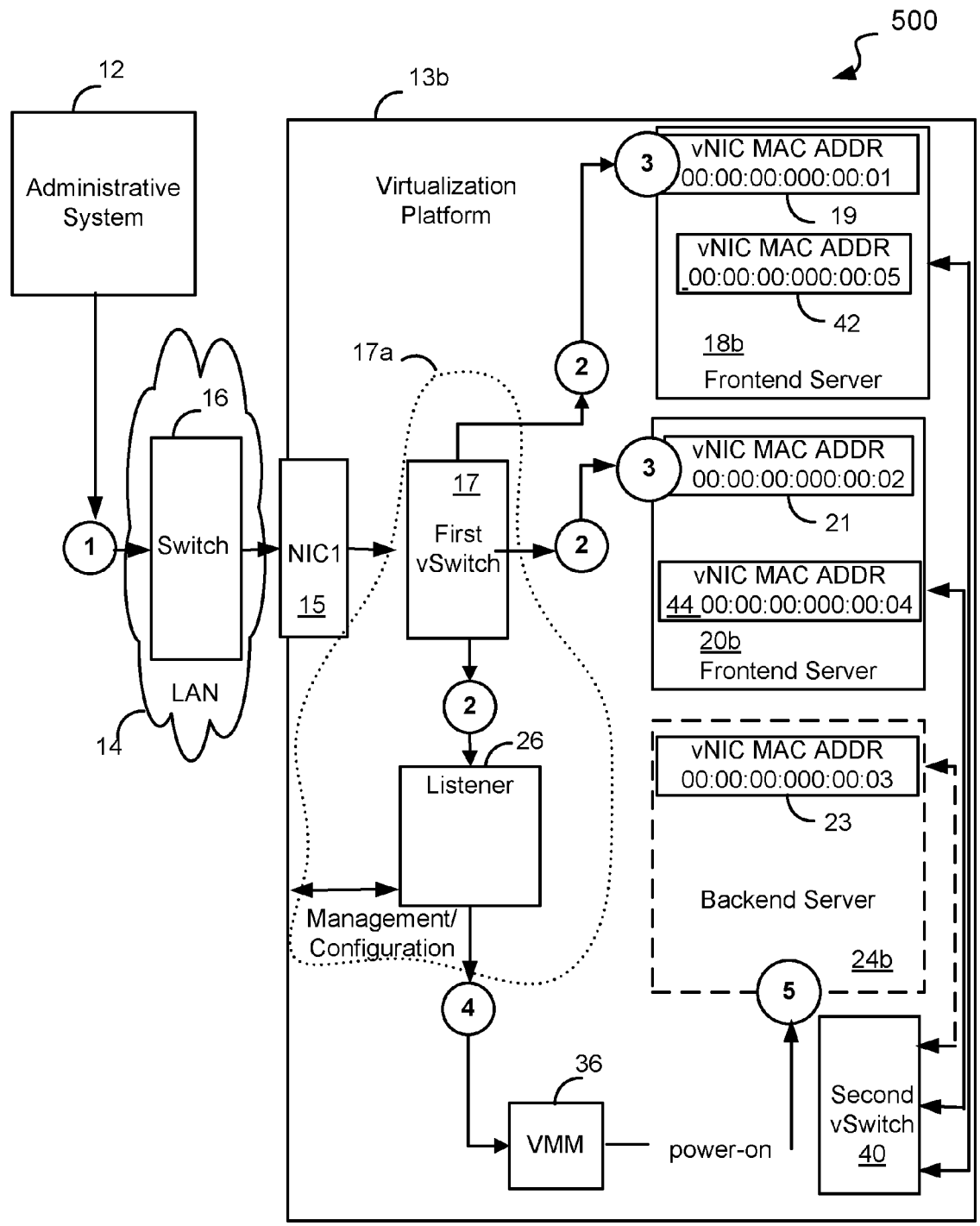
FIG. 5(a) illustrates another embodiment of the improved WOL technology of the present invention.
Figure 5B:
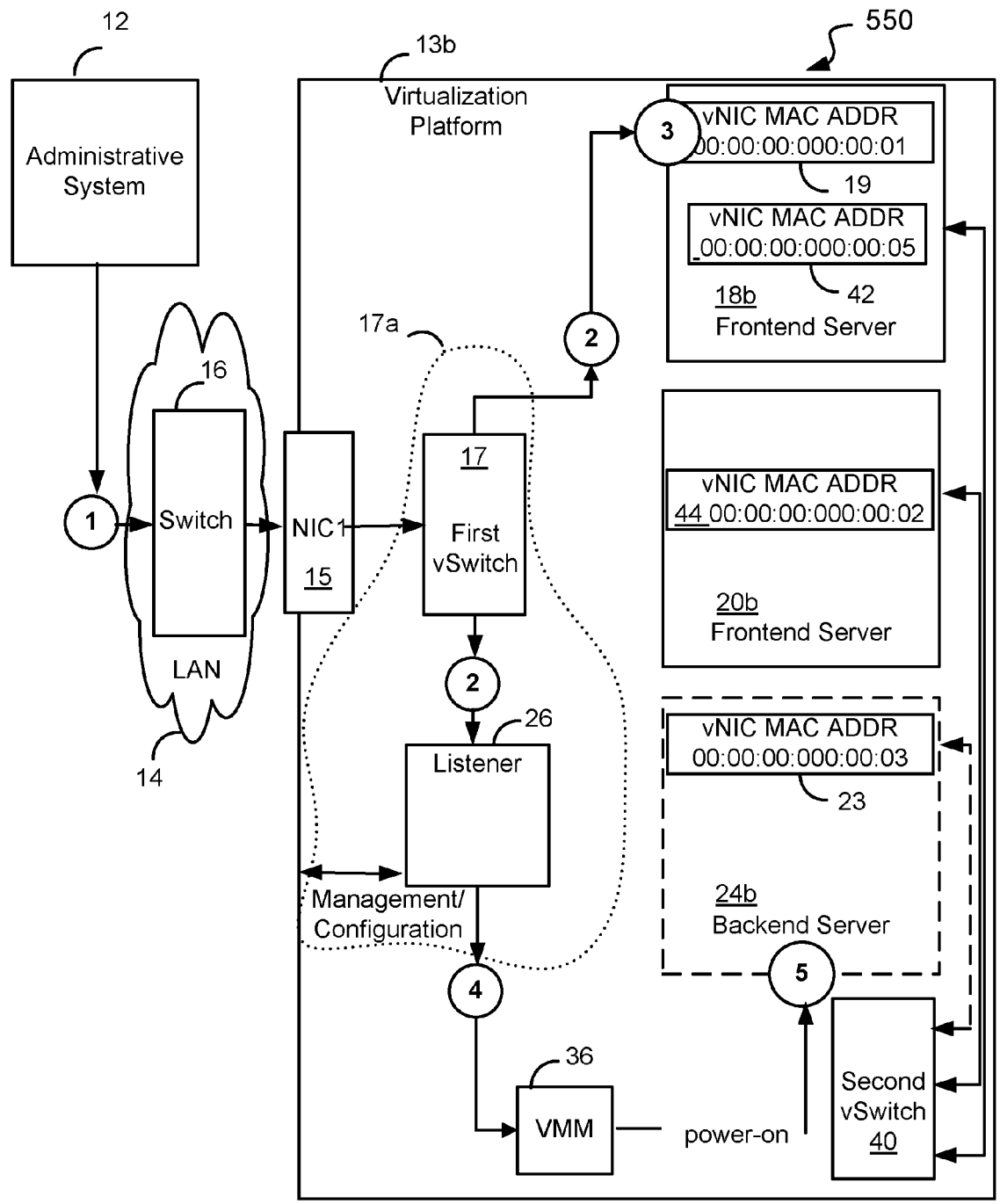
FIG. 5(b) illustrates an additional embodiment of the improved WOL technology of the present invention.

Block diagram 500 of FIG. 5(a) illustrates another embodiment of the WOL technology of the present invention. There are three VMs in this example system: a Frontend Server 18b having vNICs 19 and 42, a Frontend Server 20b vNICs 21 and 44, and a Backend Server 24b having vNIC 23. In the virtualization platform 13b, more than one virtual switch may be related to the same VM as shown in FIG. 5(a), including a First vSwitch 17a that is connected to the LAN 14 and a Second vSwitch 40 that is not connected to the LAN 14 and is thus free form communication with the LAN 14. A connection between each virtual switch and a particular VM is handled by a respective vNIC. vNICs 19 and 42 connect VM 18b to the First vSwitch 17a and the Second vSwitch 40 respectively. vNICs 21 and 44 are used to connect VM 20b to the First vSwitch 17a and the Second vSwitch 40 respectively. VNIC 23 connects VM 24b to the Second vSwitch 40. Out of the two virtual switches the First vSwitch 17a is configured to be the only virtual switch supporting WOL as a proxy as the First vSwitch 17a is the only virtual switch receiving packets from the LAN 14. The purpose of the second vSwitch 40 in FIG. 5(*a*) is to provide inter-communication among the Frontend Servers 18*b* and 20*b* and the Backend Server 24*b*. Although the VM 24*b* is not directly connected to the First vSwitch 17*a*, this embodiment of the invention enables the VM 24*b* to use WOL. The First vSwitch 17*a* receives the power-on message from the LAN 14 and sends a power-on command to the VMM 36 through its own Software Development Kit specifying VM 24*b* to power on. Block diagram 550 presented in FIG. 5(*b*) displays another embodiment in which only the Frontend Server 18*b* is connected to the First vSwitch 17*a* through vNIC 19. The two other VMs 20*b* and 24*b* are connected to the Second vSwitch 40 through vNIC 44 and vNIC 23 respectively. Once again, although VMs 20*b* and 24*b* are not connected to the First vSwitch 17*a* and the LAN 14 on which the power-on message arrives, this embodiment of the invention can selectively power on one or both of the VMs 20*b* and 24*b* in response to a power-on message. This is because the First vSwitch 17*a* receives the power-on message from the LAN 14 and sends a power-on command to the VMM 36 through its own Software Development Kit specifying one or both of the VMs 20*b* and 24*b* to power on. As in the case of FIG. 5(*b*) the Second vSwitch 40 does not contribute to WOL but is used to provide inter-communication among VMs 24*b*, 20*b* and 18*b* that is connected to the Second vSwitch 40 via vNIC 42.

Figure 6:
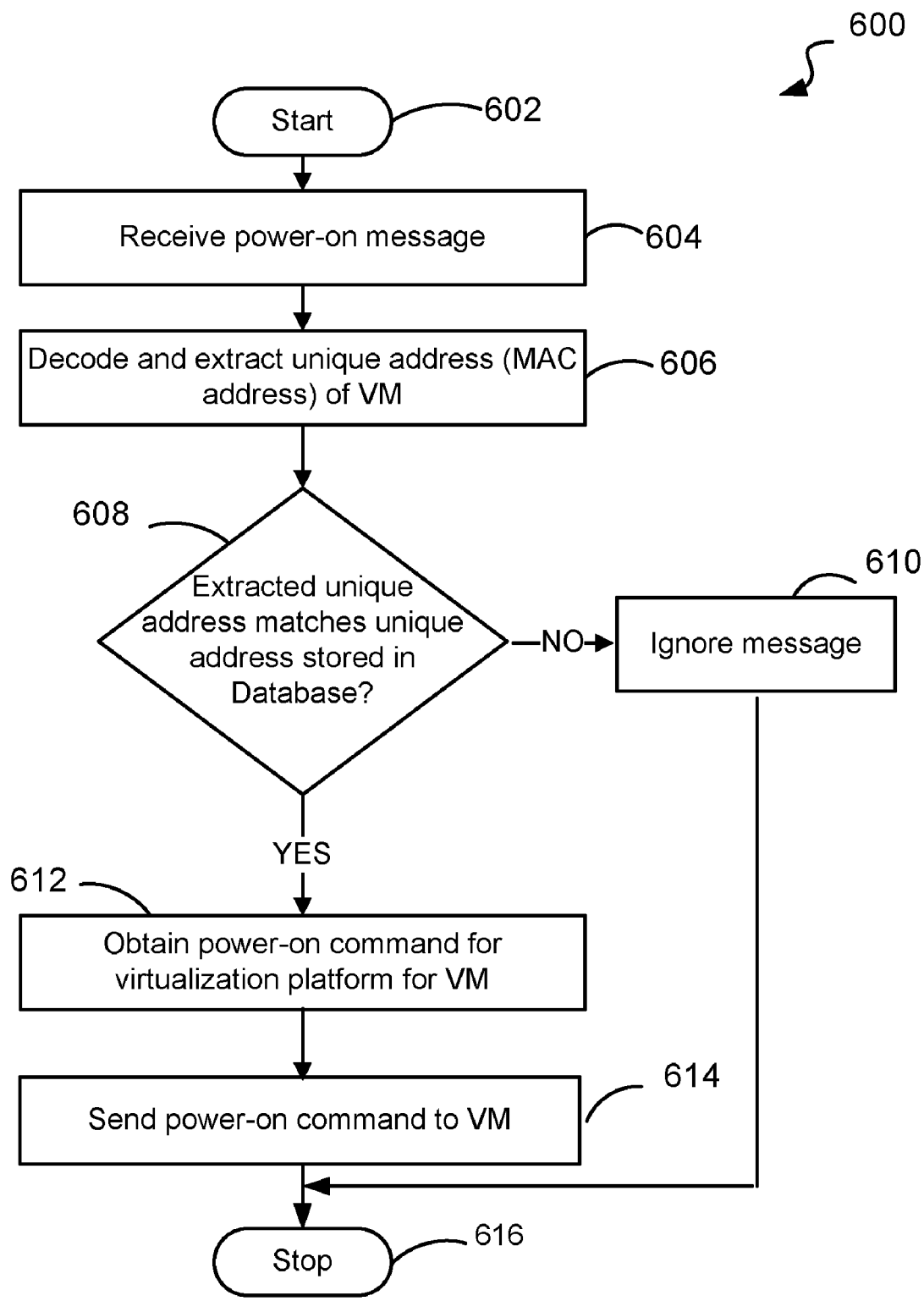
FIG. 6 shows a flowchart illustrating steps of the method for receiving a power-on message on behalf of a powered off VM.
Figure 7:
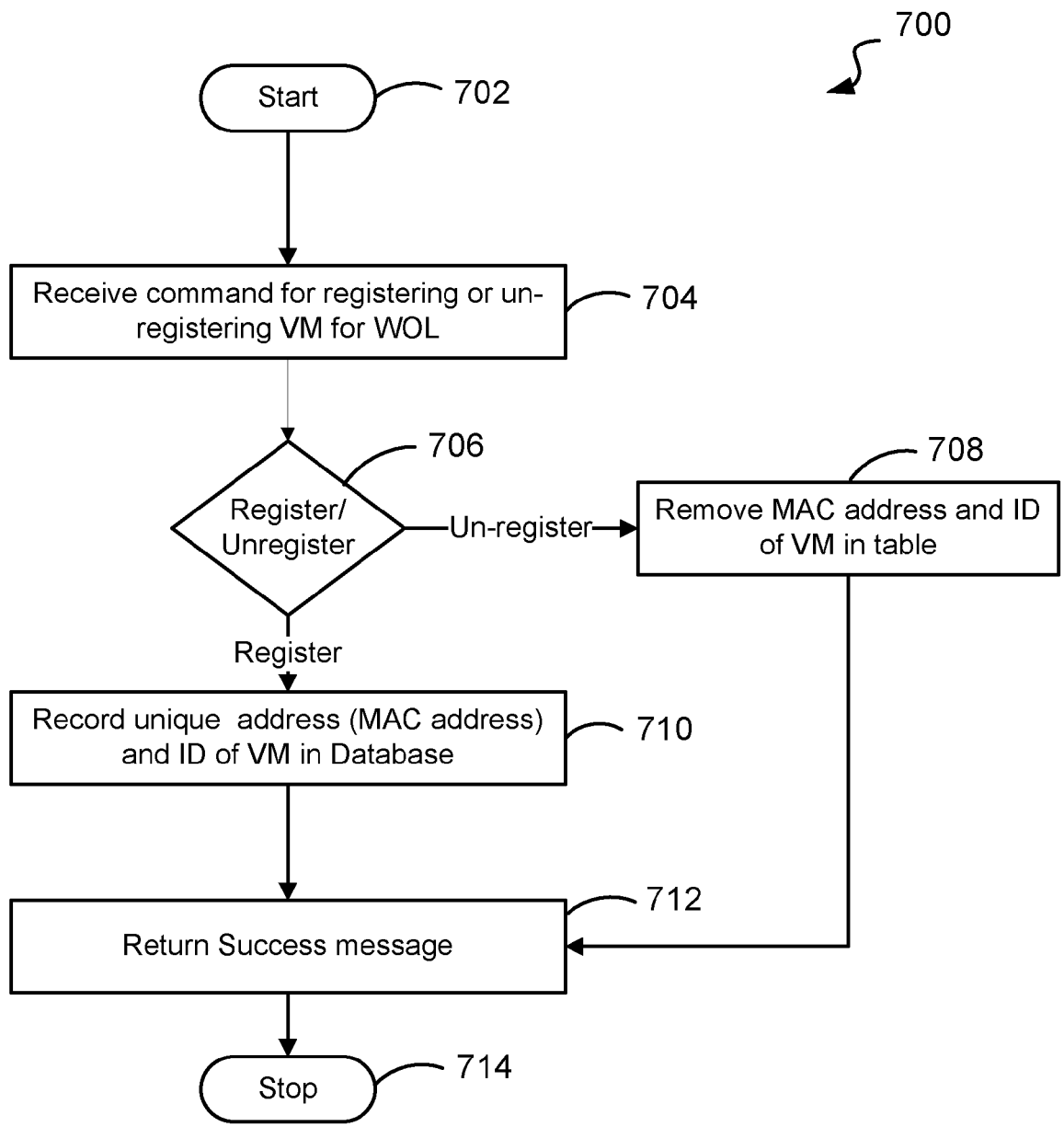
FIG. 7 shows a flowchart illustrating a method for registering or un-registering a VM for WOL.

The steps of the methods of the embodiments of the invention performed by the Listener 26 are explained with the help of flowchart 600 illustrated in FIG. 6 and flowchart 700 illustrated in FIG. 7. These flowcharts respectively correspond to Case 1 and Case 2 handled by the Listener 26, namely to receiving the power-on message for the VM and registering/un-registering the VM for WOL.

Case 1: Receiving the Power-On Message on Behalf of the Powered off VM

FIG. 6 shows a simplified flow chart 600 illustrating a procedure for receiving a power-on message on behalf of a powered off VM. The Listener 26 listens for the Magic Packet used in WOL to selectively power on one or more VMs.

Upon start (box 602), the procedure 600 begins watching the LAN 14 for a power-on message containing the Magic Packet including the unique address of the VM to be powered on. Upon receiving the power-on message (box 604) including a Magic Packet, the procedure 600 decodes the power-on message and extracts the unique address (MAC address) of the VM to be powered on (box 606). Whether or not the extracted unique address matches an assigned unique address stored in the Database 406 is checked next (box 608). If there is match, the procedure 600 exits 'YES' from box 608 and obtains the power-on command for the virtualization platform 13*a* (that includes the hypervisor) on which the VM is running e.g. VM 24*a* (box 612). Please note that the power-on command can vary from one virtualization platform to another. The procedure 600 sends the power-on command (box 614) specifying the VM to be powered on via a power-on Application Programming Interface (API) call to the Virtual Machine Manager 36 of the virtualization platform 13*a*, for example, and exits (box 616). This power-on command is sent regardless of a potential success or failure due to misconfiguration or missing files in the virtualization platform 13*a*. A failure would result in the same outcome that occurs when a computer has no auxiliary power on the NIC, or when a hardware problem has occurred on the system. A system administrator will need to diagnose the problem when she/he is unable to power on the VM. If the extracted unique address is not found in the Database the procedure 600 ignores the power-on message (box 610) and exits (box 616).

Case 2: Registering and Un-Registering a VM for WOL

FIG. 7 shows a flowchart 700 illustrating a procedure for registering and un-registering a VM for WOL. This procedure can be performed at any time, it does not require the VM in any particular power state to activate this procedure. Upon start (box 702), the procedure 700 receives a command for registering or un-registering a VM (box 704), the command containing a respective ID of the VM (for example, VM 18*a*, 20*a* or 24*a* of FIG. 3) as well as its assigned unique address (MAC Address). The command for registering/un-registering a VM can be initiated by the virtualization platform 13*a* or by the system administrator through the WS interface 402. Although there are up to 4 NICs associated to a VM, it is customary that only one NIC (primary NIC) is registered. In this embodiment the MAC address of all 4 NICs could be registered, as only one would succeed in the power-on command when the Magic Packet arrives. After receiving the power-on command the procedure 700 checks the type of the command (box 706). If it is a command for registering a VM, the procedure 700 exits 'Register' from box 706 and records the assigned unique address (MAC address) and the ID of the VM in the Database 406 (box 710), returns a "Success" message to the caller (box 712) and exits (box 714). If it is a command for un-registering a VM, the procedure 700 exits 'Un-register' from box 706, removes the assigned unique address and the ID of the VM from the Database 406 (box 708), returns a "Success" message to the caller (box 712) and exits (box 714). Although each VM has a unique ID, it can include multiple vNICS each of which has its own MAC address and may be connected to a different virtual switch. When the command for un-registering the VM includes the ID of the VM, all registered MAC addresses for that VM are un-registered.

Thus, an improved method and system for supporting WOL in a virtualized environment, have been provided.

Although specific embodiments of the invention have been described in detail, it should be understood that the described embodiments are intended to be illustrative and not restrictive.

Figure 8:
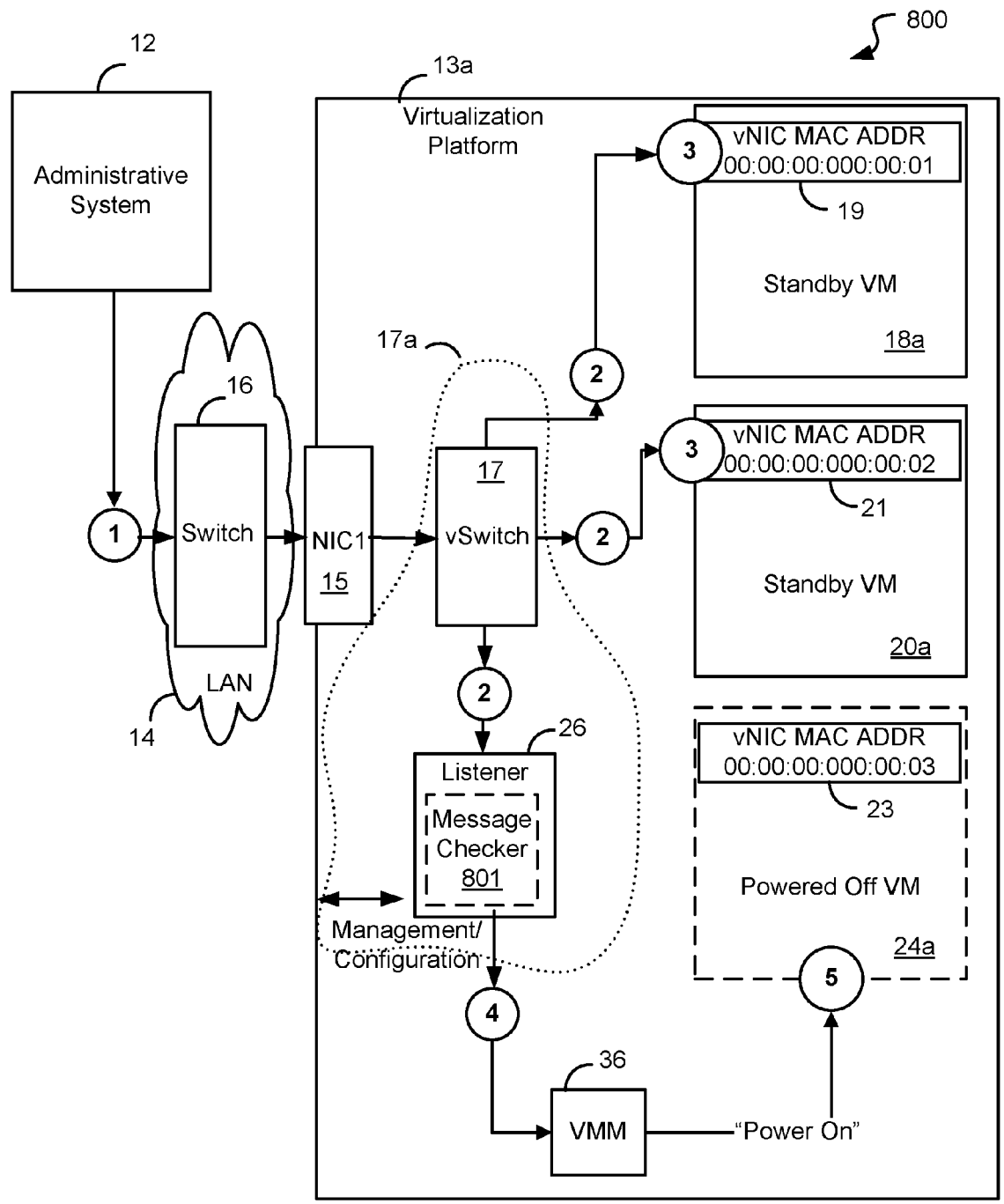
FIG. 8 illustrates another embodiment of the invention, which is capable of processing both power-on and power-off messages.

Various changes and modifications of the embodiments shown in the drawings and described in the specification may be made within the scope of the following claims without departing from the scope of the invention in its broader aspect. For example, the Listener 26 can be implemented on a remote computer connected to the LAN 14. Similar to the power-on command described earlier, a power-off command can be sent by an authorized person such as the system administrator for selectively powering off virtual machines. Before executing such a command, the command needs to be authenticated for ensuring an authorized person is using the command. A modification of the embodiments of the invention handling a power-on and power-off message is illustrated in FIG. 8. The system shown in FIG. 8 is the same as the system shown in FIG. 3 except for the Listener 26 having a Message Checker 801, which receives a power-on or power-off message includes unique addresses of the virtual machines to be powered on or powered off. Based on the message type (power-on or power-off), the Message Checker 801 powers on or powers off those virtual machines, whose assigned unique addresses stored in the Database 406 match with the unique addresses of the virtual machines in the message.

What is claimed is:

1. A method for supporting Wake-on-LAN (WOL) for selectively powering on virtual machines having no network connectivity to a local area network (LAN), the method comprising:
   employing at least one processor for:
      (a1) introducing a Listener into the LAN, the Listener being capable of acting as a proxy for one or more virtual machines, managed by a virtual machine manager, to select at least one of said one or more virtual machines to be powered on, said at least one of said one or more virtual machines being powered off and not having a network connectivity to the LAN;
      (b1) configuring the Listener, comprising identifying assigned unique addresses of said one or more virtual machines, for which the Listener should be responding;
      (c1) receiving, by the Listener, a power-on message in the LAN, said power-on message including unique addresses of said at least one of said one or more virtual machines;
      (d1) sending, by the Listener, a command to the virtual machine manager to power on those virtual machines among said one or more virtual machines, whose assigned unique addresses match with the unique addresses in the power-on message.

2. The method of claim 1, further comprising storing the assigned unique addresses in a database.

3. The method of claim 2, wherein said one or more virtual machines are the following:
   (a3) virtual machines in the LAN that have been powered off; or
   (b3) all virtual machines in the LAN, including virtual machines in a standby mode, and virtual machines that have been powered off.

4. The method of claim 2, wherein the storing the assigned unique addresses further comprises:
   (a5) receiving a command for registering a virtual machine for enabling the Wake-on LAN on the virtual machine, the command including the assigned unique address of the virtual machine; and
   (b5) recording the assigned unique address of the virtual machine in the database.

5. The method of claim 4, further comprising disabling the Wake-on LAN on selected virtual machines in response to an un-registering command.

6. The method of claim 5, wherein the disabling the Wake-on LAN on selected virtual machines comprises:
   (a7) receiving the un-registering command for the virtual machine, the un-registering command including the assigned unique address of the virtual machine; and
   (b7) removing the assigned unique address of the virtual machine from the database.

7. The method of claim 6, wherein the assigned unique address is a Media Access Control (MAC) address of the virtual machine.

8. The method of claim 2, further comprising running the virtual machines and the Listener on a hypervisor.

9. The method of claim 1, wherein the step (d1) further comprises:
   (a4) selecting a power-on command depending on a virtualization platform on which a virtual machine is running; and
   (b4) sending the power-on command selected in the step (a4) to the virtual machine.

10. The method of claim 1, further comprising:
    (a19) by the Listener, receiving a power-off message including unique addresses of virtual machines to be powered off;
    (b19) by the Listener, decoding the power-off message to extract the unique addresses received in step (a19);
    (c19) by the Listener, comparing the extracted unique addresses with the assigned unique addresses; and
    (d19) powering off the virtual machines, the assigned addresses of which match the extracted unique addresses;
    the steps (a19)-(d19) being performed after the step (d1).

11. The method of claim 1, further comprising:
    connecting a subset of the virtual machines to the LAN through a first virtual switch, including the Listener; and
    connecting remaining virtual machines with the subset of virtual machines by a second virtual switch that is free from communication with the LAN and provides intercommunication among the virtual machines.

12. A system for supporting Wake-on-LAN (WOL) for selectively powering on virtual machines having no network connectivity to a local area network (LAN), the system comprising:
    a processor;
    a computer readable storage medium comprising computer readable instructions stored thereon for execution by the processor, forming:
       (a10) a Listener being capable of acting as a proxy for one or more virtual machines, managed by a virtual machine manager, to select at least one of said one or more virtual machines to be powered on, said at least one of said one or more virtual machines being powered off and not having a network connectivity to the LAN;
       (b10) the Listener being configured to identify assigned unique addresses, assigned to said one or more virtual machines the Listener should be responding for;
       (c10) the Listener being further configured to:
          receive a power-on message in the LAN, said power-on message including unique addresses of said at least one of said one or more virtual machines;
          send a command to the virtual machine manager to power on those virtual machines among said one or more virtual machines, whose assigned unique addresses match with the unique addresses in the power-on message.

13. The system of claim 12, wherein said one or more virtual machines comprises virtual machines that have been powered off.

14. The system of claim 13, wherein said one or more virtual machines comprise all virtual machines in the LAN, including virtual machines in a standby mode, and virtual machines that have been powered off.

15. The system of claim 14, wherein the Listener further comprises:
    (a13) a Rules Engine processing the power-on message for selectively powering on the virtual machines;
    (b13) a Web Services Interface managing and configuring the Listener including registering and un-registering of the virtual machines; and
    (c13) a Configuration Block providing administrative access for enabling or disabling of the Wake-on LAN on the virtual machines.

16. The system of claim 15, wherein the Rules Engine (a13) comprises:
    (a14) a Receiver, receiving the power-on message including unique addresses of one or more virtual machines to be powered on; and (b14) a Decoder, decoding the power-on message for extracting the unique addresses from the power-on message received by the Receiver, comparing the extracted unique addresses with the assigned unique addresses, and sending a power-on command to the virtual machines, the assigned addresses of which match the extracted unique addresses.

17. The system of claim 16, further comprising a Registration Handler, processing commands for enabling or disabling the Wake-on LAN on the virtual machines.

18. The system of claim 13, including another computer connected to the LAN for running the Listener.

19. The system of claim 12, wherein the computer includes a hypervisor for running the virtual machines and the Listener.

20. The system of claim 12, wherein the Listener comprises a message checker, receiving a message through a virtual switch (b10), the message comprising unique addresses of one or more virtual machines and a message type including one of power-on and power-off, and based on the message type, powering on or powering off those virtual machines, whose the assigned unique addresses match with the unique addresses in the message.

21. The system of claim 12, further comprising:
   (a21) a first virtual switch, connecting a subset of virtual machines to the LAN and providing support for the Wake-on LAN; and
   (b21) a second virtual switch free of connection to the LAN, connecting remaining virtual machines with the subset of virtual machines and providing inter-communication among the virtual machines;
   and wherein the Listener is configured to receive the power-on message through the first virtual switch (a21).

22. A non-transitory computer readable storage medium, having a computer readable program code instructions stored thereon for execution by a processor, causing the processor to:
   (a1) introduce a Listener into a local area network (LAN), the Listener being capable of acting as a proxy for one or more virtual machines, managed by a virtual machine manager, to select at least one of said one or more virtual machines to be powered on, said at least one of said one or more virtual machines being powered off and not having a network connectivity to the LAN;
   (b1) configure the Listener, comprising identifying assigned unique addresses of said one or more virtual machines the Listener should be responding for;
   (c1) receive, by the Listener, a power-on message in the LAN, said power-on message including unique addresses of said at least one of said one or more virtual machines;
   (d1) send, by the Listener, a command to the virtual machine manager to power on those virtual machines among said one or more virtual machines, whose assigned unique addresses match with the unique addresses in the power-on message.

* * * * *